United States Patent [19]

Kanemasa

[11] 4,407,018

[45] Sep. 27, 1983

[54] DIGITAL SIGNAL PROCESSOR SUITED FOR LSI FABRICATION

[75] Inventor: Akira Kanemasa, Tokyo, Japan

[73] Assignee: Nippon Electric Co., Ltd., Tokyo, Japan

[21] Appl. No.: 252,861

[22] Filed: Apr. 10, 1981

[30] Foreign Application Priority Data

Apr. 18, 1980 [JP] Japan .................. 55-51272

[51] Int. Cl.³ ............................ G06F 15/31
[52] U.S. Cl. .................. 364/736; 364/724; 364/726
[58] Field of Search ......... 364/716, 724, 726, 735, 364/736

[56] References Cited

U.S. PATENT DOCUMENTS

| | | | |
|---|---|---|---|
| 4,020,334 | 4/1977 | Powell et al. | 364/726 |
| 4,128,890 | 12/1978 | Irwin et al. | 364/724 |
| 4,157,589 | 6/1979 | Kapral et al. | 364/716 |
| 4,255,794 | 3/1981 | Nakayama | 364/724 |

OTHER PUBLICATIONS

"Special Purpose Hardware for Digital Filtering", by S. K. Freeny, Proceedings of the IEEE, vol. 63, No. 4, Apr. 1975, pp. 663-648, particularly, FIG. 16 on p. 643.
"Multiplier-Accumulator Application Notes", by L. Schirm IV, TRW LSI Products, Jan. 1980, pp. 7-9, particularly FIG. 8, FIG. 11 and FIG. 13.
"An Approach to the Implementation of Digital Filters", by L. B. Jackson et al., IEEE Transactions on Audio and Electrocaustics, vol. AU-16, No. 3, Sep. 1968, pp. 413-421, particularly FIG. 8 on p. 416.

*Primary Examiner*—Jerry Smith
*Attorney, Agent, or Firm*—Blakely, Sokoloff, Taylor & Zafman

[57] ABSTRACT

A digital signal processor is disclosed suited for LSI fabrication comprising a data input circuit for carrying out scaling on a plurality of serial data supplied through a first external terminal group; a coefficient input circuit for carrying out 2's complement conversion on a plurality of specific data from a plurality of serial data supplied through a second external terminal group; a multiplier circuit for carrying out a plurality of multiplications and additions on data from the data input and coefficient input circuits; and an adder circuit for carrying out a plurality of additions and subtractions as well as overflow detection and correction. Data connections in each of the circuits are altered depending on a combination of logical zeros and ones entered through a fourth external terminal group so that one of a plurality of functional modes is selected.

3 Claims, 18 Drawing Figures

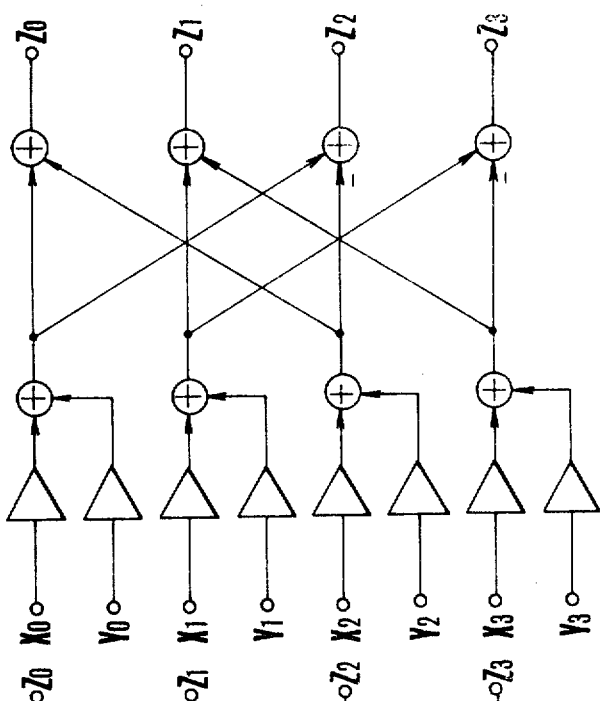
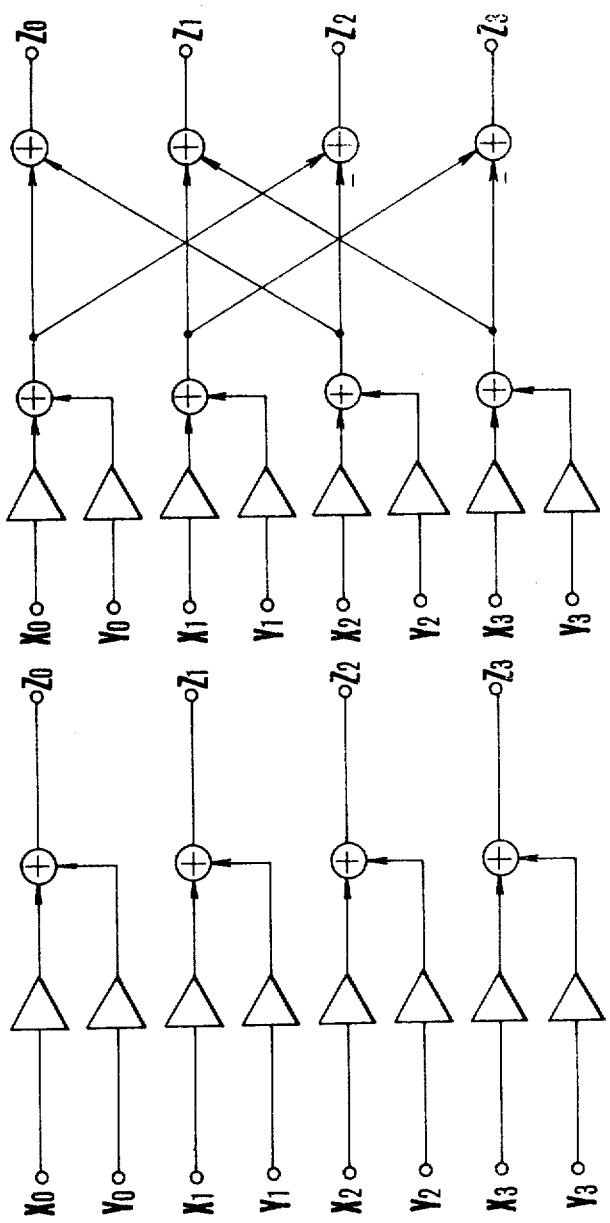

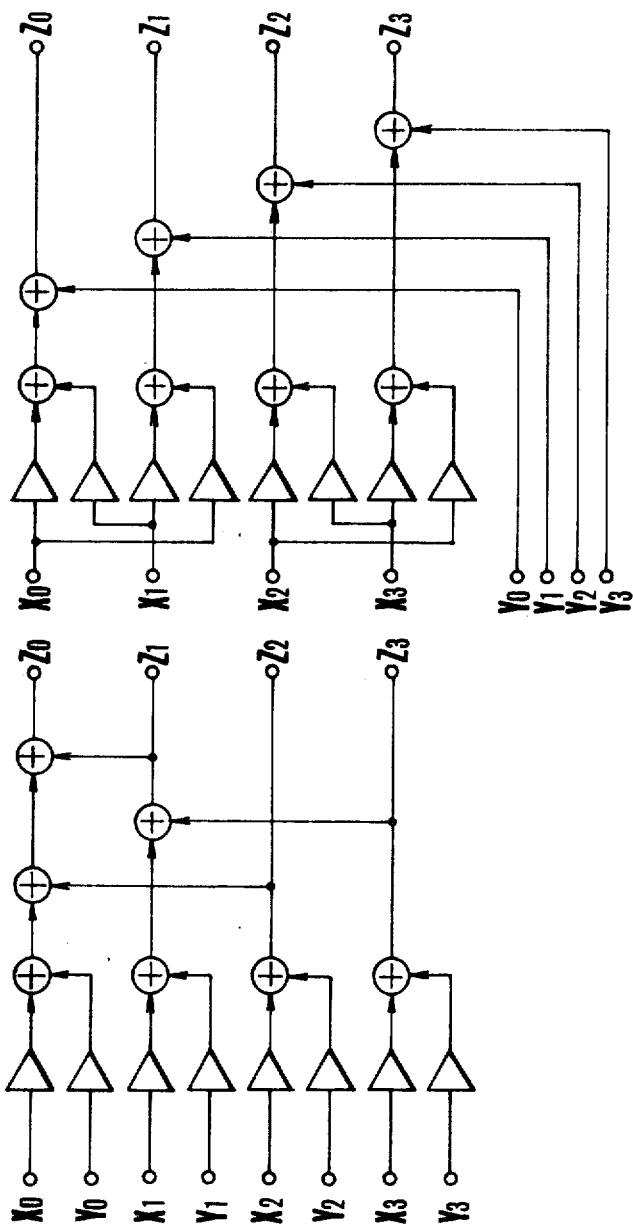
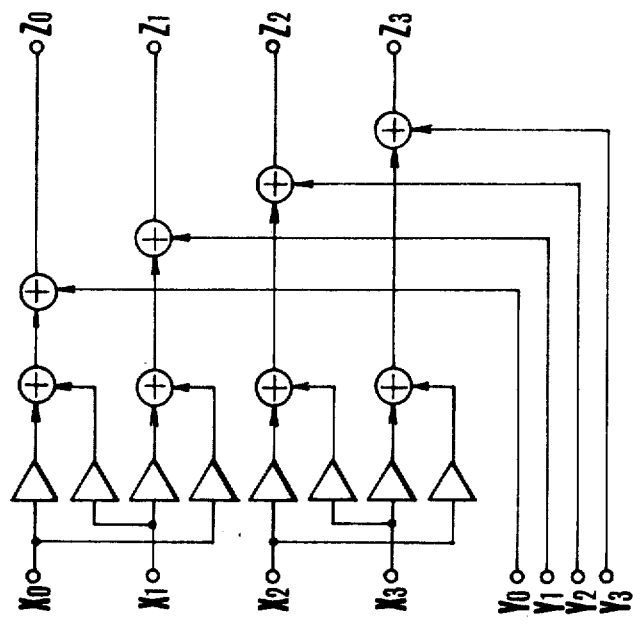

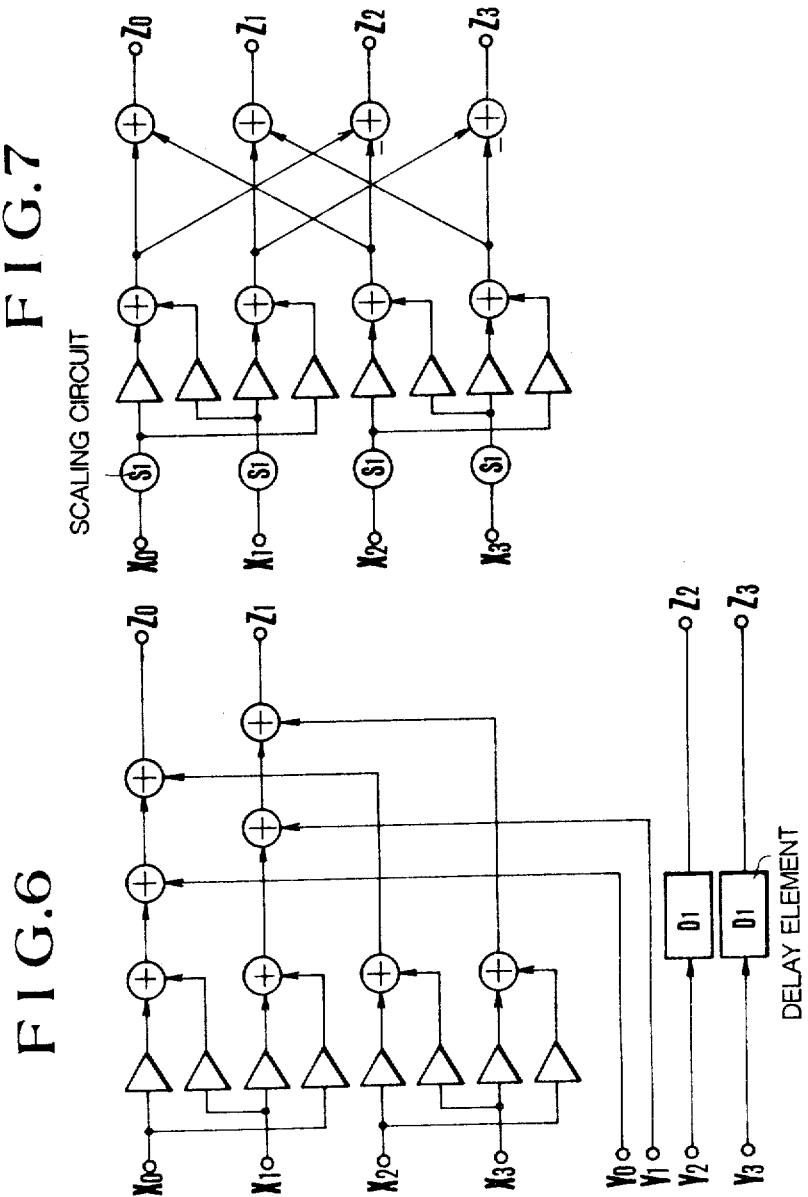

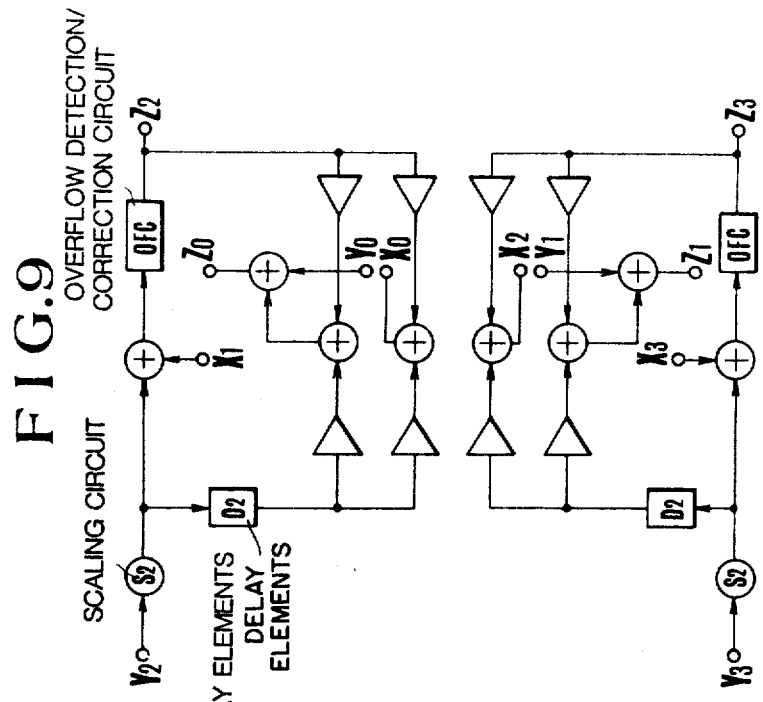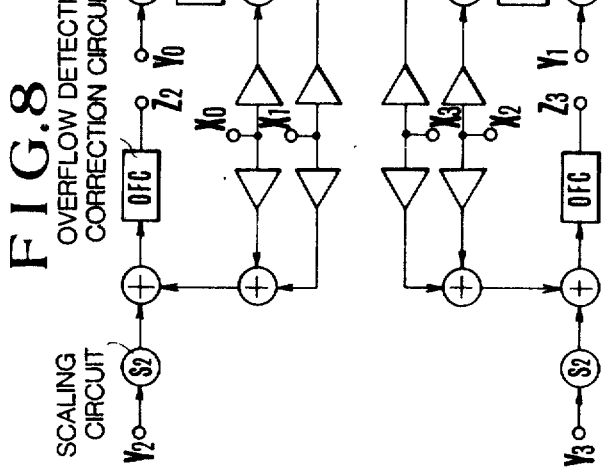

F I G.10
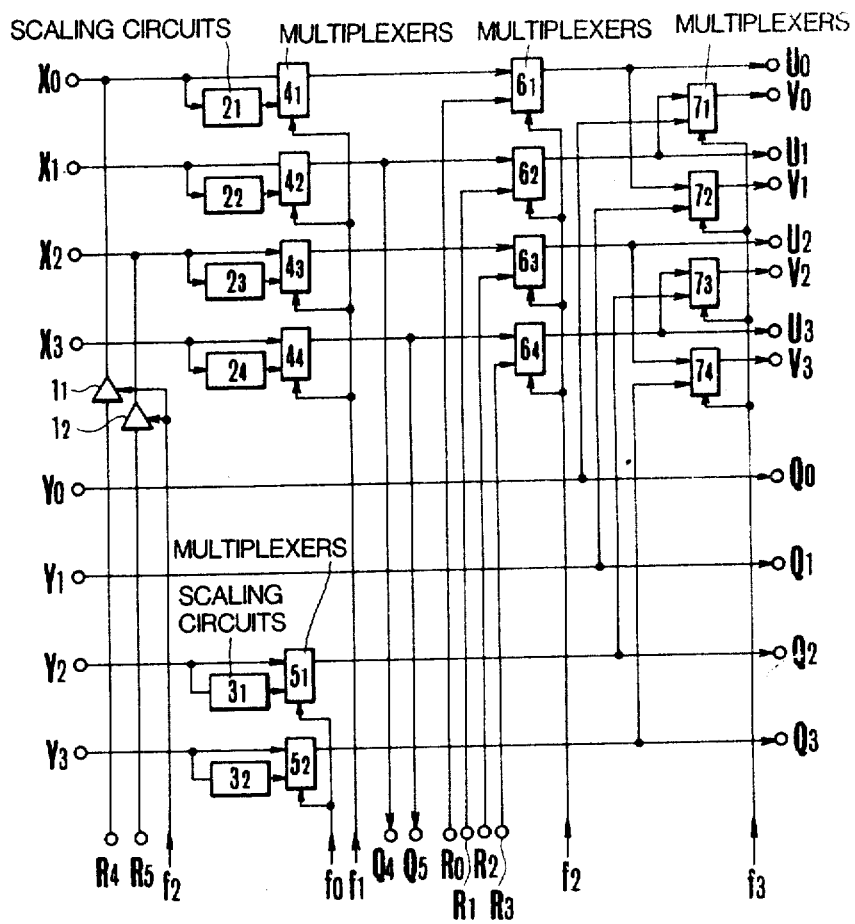

F I G. 11
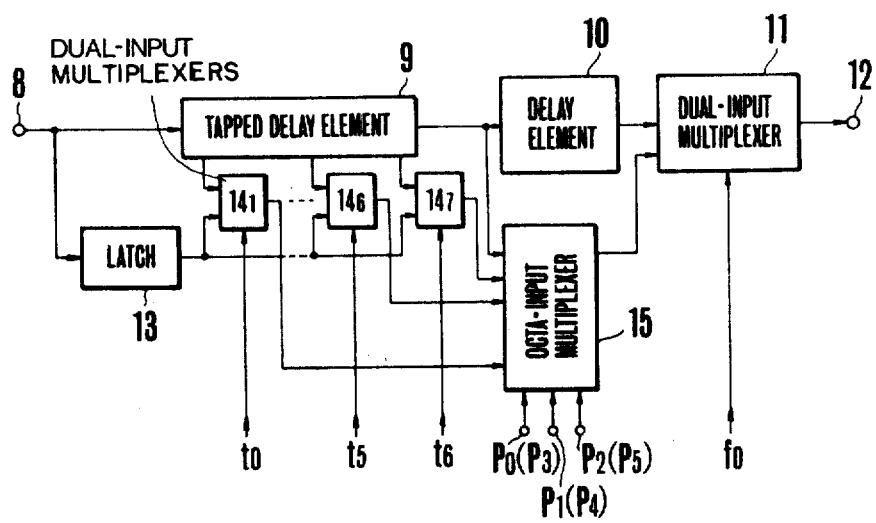
F I G. 12
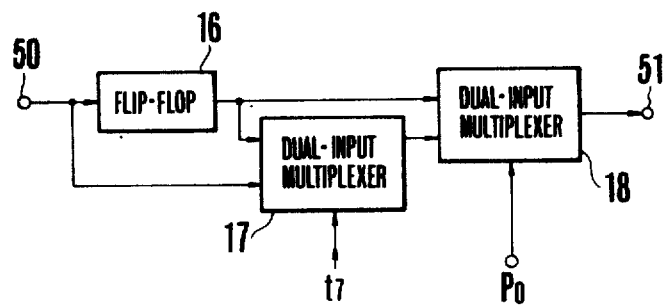

F I G. 17
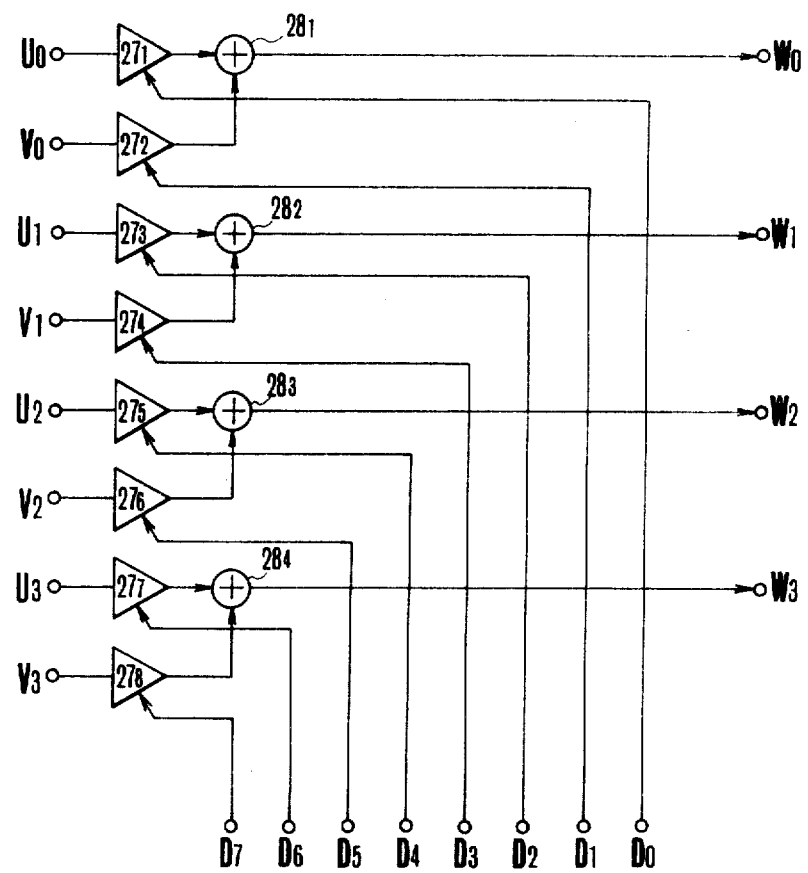

DIGITAL SIGNAL PROCESSOR SUITED FOR LSI FABRICATION

BACKGROUND OF THE INVENTION

The present invention relates to a digital signal processor suited for LSI fabrication.

In digital signal processing such as digital filtering and fast discrete Fourier transformation (FFT), the fundamental constituents are multipliers, adder-subtractors and delay elements. These three types of elements are combined to realize desired functions. When digital signal processing technology is applied to the field of communications, real time processing is required.

Digital signal processing circuitry for handling real time processes require high processing speeds, and in the conventional system, hardware has been constructed by employment of independent integrated circuits (ICs), as disclosed in an article entitled "Special-Purpose Hardware for Digital Filtering", by S. K. Freeny, PROCEEDING OF THE IEEE, VOL 63, No. 4, April 1975, PP. 633–648, particularly FIG. 16 on page 643. Such circuitry disadvantageously has a large amount of hardware, since many IC chips including multipliers, adders, random access memories (RAMs) and controllers were used. Particularly, when the operational speed of the multiplier is slower than that required, many multipliers must be used to perform multiplication, resulting in a large scale hardware implementation.

On the other hand, real time digital signal processing circuitry by employment of commercially-available microprocessors has also been contemplated. In this case, bit-slice microprocessors of the bipolar type are much advantageous in arithmetic processing capabilities as compared with microprocessors realized with metal oxide semiconductor (MOS) devices. The most distinctive advantage in using microprocessors over using independent ICs is that identical hardware may be used to achieve many functional operations only by changing the contents of the program memory. However, even with the bipolar bit-slice microprocessor, real time processing for a large amount of computations per unit time cannot be effected at sufficiently high speeds, and eventually a further large scale hardware is required relative to the arrangement by use of independent ICs as mentioned above.

In view of the aforementioned situation, the most advanced device technologies are applied to the development of large-scale integration (LSI) devices for processing digital signals for the purpose of reducing hardware scale, as disclosed in a publication entitled "Multiplier-Accumulator Application Notes", by L. Shirm IV, Trw LSI Products, January 1980, pp. 7–9, particularly FIG. 8, FIG. 11 and FIG. 13. The following four approach directions in developing such LSI devices are considered.

Firstly, reduction in the scale of overall hardware is contemplated by improving the processing speed of independent integrated circuits such as multipliers and adders. In this method, however, reduction of hardware is limited, since each constituent element is separately integrated into an IC chip, and a total power consumption increases because of a high clock rate.

Secondary, a number of multipliers and adders are contemplated to integrate into a single IC chip. In this method, however, individual multipliers and adders must be able to operate independently so as to provide general-purpose capabilities, resulting in a large number of input/output pins and also a requirement of external ICs for timing individual I/O data.

Thirdly, LSIs for exclusive uses are developed at the sacrifice of general-purpose capabilities in order to compensate the drawback in the second method. Large scale integration includes delay elements in addition to the arithmetically operating portions. This method permits the incorporation of large scale integration for specific functions within an accommodation range which can be achieved by the present-day device technologies, providing the best solution for minimizing the scale of hardware for individual circuitry. However, for constructing a system, a variety of LSIs must be designed in small production rate, resulting in an immense manufacturing cost.

Fourthly, signal processors which are the enhancement of microprocessors are developed. In signal processors for implementing real time signals, program read only memories (ROMs), coefficient ROMs, data storage random access memories (RAMs), and multipliers are accommodated in one chip in addition to the arithmetic unit. This method provides versatility in function by way of changing the program. However, since the arithmetic word length is fixed, LSIs with a large word length need to be developed for systems requiring a high computational accuracy. This causes an increase in hardware, resulting in a low processing speed and increased peripheral circuitry. This method is suitable for single channel processing, however, for multi-channel processing, time for data input/output is no longer negligible relative to time for computing and thus processing speed is lowered.

The first method may be put into practice independently or in combination with any of the second, third and fourth methods. As described above, many attempts have been made to realize large-scale integration for real time digital signal processors, and each method has respective advantages and disadvantages. Particularly, LSI devices for multi-channel processing must meet the following conditions:

(1) The device functions must be oriented to general-purpose capabilities.

(2) The number of input/output pins must be as small as possible.

(3) The number of external circuits required must be as small as possible.

(4) The devices must be easy to use for the user.

The above-mentioned conditions are inconsistent with each other. For example, it is generally considered that condition (1) is inconsistent with conditions (2) and (3). Condition (1) weighs with the second of the foregoing methods of large-scale integration, and conditions (2) and (3) weigh with the third method. That is to say, prior art methods of large-scale integration do not satisfy all of conditions (1) through (4) at the same time.

SUMMARY OF THE INVENTION

Accordingly, it is an object of the present invention to provide a general-purpose digital signal processor suited for LSI fabrication.

It is another object of the present invention to provide a digital signal processor suited for LSI fabrication which requires less input/output pins and less external circuitry.

It is a further object of the present invention to provide a digital signal processor suited for LSI fabrication which can be used easily by the user.

According to this invention, the above objects can be accomplished by a digital signal processor suited for LSI fabrication comprising:

a data input circuit for carrying out scaling on a plurality of serial data supplied through a first external terminal group;

a coefficient input circuit for carrying out 2's complementary conversion on a plurality of specific data out of a plurality of serial data supplied through a second external terminal group;

a multiplier circuit operative to receive a plurality of outputs from said data input circuit and said coefficient input circuit for carrying out a plurality of multiplications and additions;

an adder circuit operative to receive a plurality of outputs from said multiplier circuit and said data input circuit and supply a plurality of data to a third external terminal group and said data input circuit, for carrying out a plurality of additions and subtractions as well as overflow detection and correction; and means for altering data connection in each of said circuits, depending on the combination of 0's and 1's entered through a fourth external terminal group so that one of a plurality of functional modes is selected.

BRIEF DESCRIPTION OF THE DRAWINGS

FIGS. 2 through 9 are block diagrams showing eight possible functions achieved by the circuit arrangement shown in FIG. 1;

FIG. 10 is a block diagram showing the data input circuit shown in FIG. 1;

FIG. 11 is a block diagram showing the $2^{-n}$-scaling circuit shown in FIG. 10;

FIG. 12 is a block diagram showing the $\frac{1}{2}$-scaling circuit shown in FIG. 10;

FIG. 17 is a block diagram showing the multiplier circuit shown in FIG. 1; and

DESCRIPTION OF PREFERRED EMBODIMENT

Figure 1:
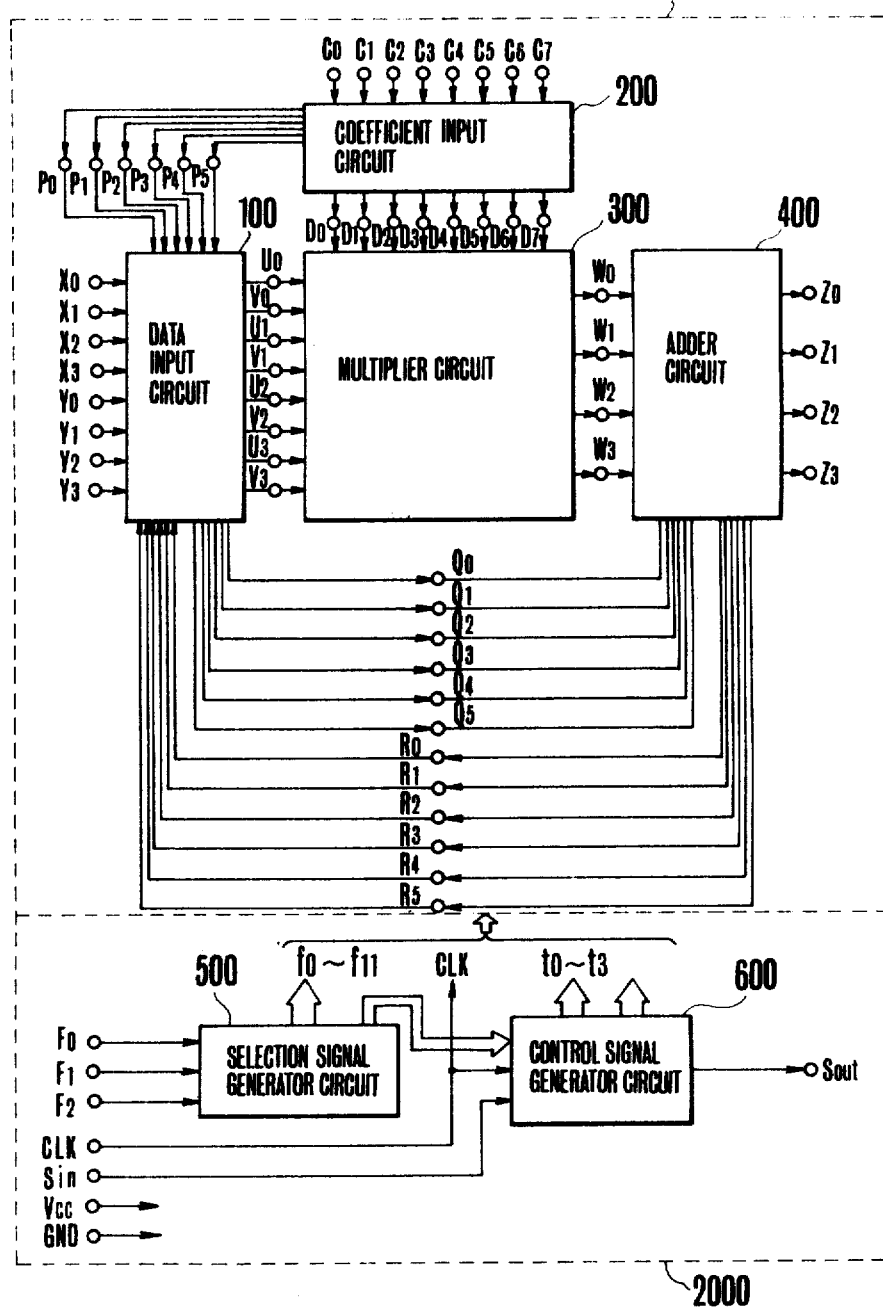
FIG. 1 is a block diagram showing an embodiment of the present invention.

Referring now to FIG. 1, there is shown a preferred embodiment of the present invention comprising: a data input circuit 100, a coefficient input circuit 200, a multiplier circuit 300, an adder circuit 400, a selection signal generator circuit 500, and a control signal generator circuit 600. The circuits 100, 200, 300 and 400 constitute a block 1000 as illustrated by broken line, and the cirucits 500 and 600 constitute another block 2000, also designated by broken line. Terminals of the circuits included in the block 2000 are connected to terminals of the circuits included in the block 1000, as will be described later, to ensure that data connection in each of the circuits of block 1000 is altered by the circuits of block 2000. The processor is also provided with data input terminals X0 through X3 and Y0 through Y3, coefficient input terminals C0 through C7, function selective input terminals F0 through F2, a clock input terminal CLK, a synchronization (sync) input terminal Sin, a power supply terminal Vcc, and a ground terminal GND. Input terminals X0 and X2 are also used as the output terminals in specific functional mode as will be described later. The processor further includes data output terminals Z0 through Z3, a sync signal output terminal Sout, and intermediate terminals D0 through D7, P0 through P5, U0 through U3, V0 through V3, W0 through W3, Q0 through Q5, and R0 through R5.

In the following description, input/output data and coefficients are assumed to be expressed in 2's complement serial data format topped by the least significant bit (LSB).

In FIG. 1, one of eight functional modes can be selected by combination of binary signals ("0"s and "1"s)supplied to the input terminals F0, F1 and F2.

FIGS. 2 and 9 are block diagrams explaining the eight possible functions achieved by use of the arrangement shown in FIG. 1. In these block diagrams, the coefficient input circuit 200 of FIG. 1 is omitted, and all reference characters correspond to those shown in FIG. 1.

FIG. 2 shows four sets of circuits adapted to perform a function FCO for obtaining (AX+BY), where A, X, B and Y are real values; FIG. 3 shows two sets of circuits adapted to perform a function FC1 for obtaining {(AX+BY)±(CS+DT)}, where A, X, B, Y, C, S, D and T are real values; FIG. 4 shows a circuit adapted to perform a function FC2 for obtaining $$\sum_{i=0}^{7} A_i X_i,$$

where $A_i$ and $X_i$ are real values; FIG. 5 shows two sets of circuits adapted to perform a function FC3 for obtaining $(\hat{A}\hat{X}+\hat{Y})$, where $\hat{A}$, $\hat{X}$, and $\hat{Y}$ are complex values; and FIG. 6 shows a circuit which performs a function FC4 for obtaining $(\hat{A}\hat{X}+\hat{B}\hat{Y}+\hat{Z})$, where $\hat{A}$, $\hat{B}$, $\hat{X}$, $\hat{Y}$ and $\hat{Z}$ are complex values. In FIG. 6, D1 denotes a delay element which is realized by a serial connection of a tapped delay element 9 and a delay element 10 as shown in FIG. 11. The delay element is useful for timing the LSB of data entered through the input terminals X0 through X3 to the LSB of data entered through the input terminals Y2 and Y3 by connecting the output terminals Z2 and Z3 to the input terminals Y0 and Y1, respectively.

FIG. 7 shows a circuit arrangement for a function FC5 in which butterfly for fast Fourier transformation (FFT) is computed. In the figure, S1 deontes a $\frac{1}{2}$-scaling circuit as shown in FIG. 12, and one of $2^0$-scaling or $2^{-1}$-scaling can be selected. For more detail, refer to the description related to FIG. 12.

Figure 18:
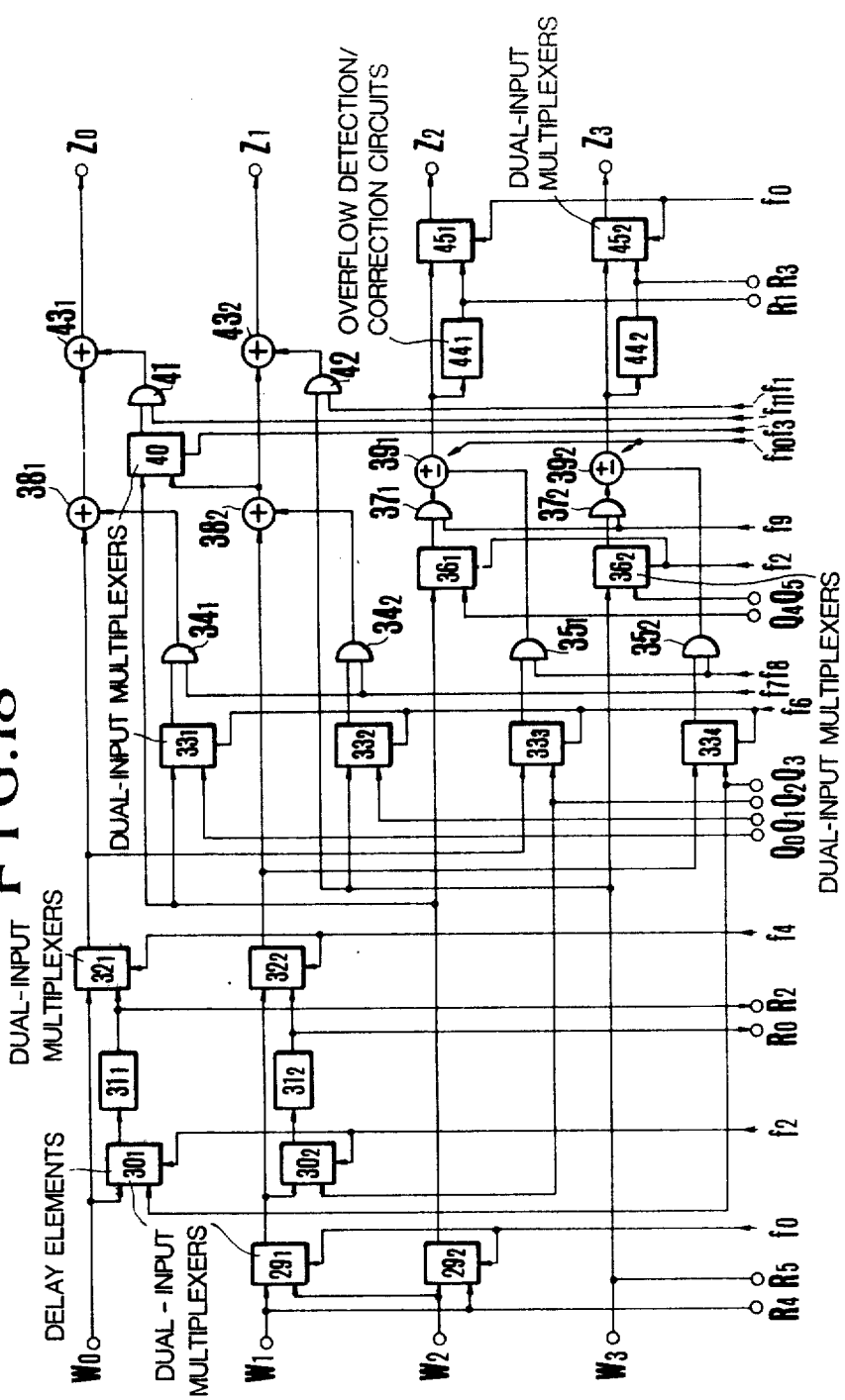
FIG. 18 is a block diagram showing the adder circuit shown in FIG. 1.

FIG. 8 shows two sets of circuits adapted to perform a function FC6 for realizing part of a 2-order recursive digital filter of 1D type excluding the portion of one sample delay circuits. In the figure, S2 denotes a $2^{-n}$-scaling circuit as shown in FIG. 11; OFC denotes overflow detection/correction circuits $44_1$ and $44_2$ as shown in FIG. 18; and D2 denotes delay elements $31_1$ and $31_2$ as shown in FIG. 18.

FIG. 9 shows two sets of circuits adapted to perform a function FC7 for realizing part of a 2-order recursive digital filter of 2D type excluding the portion of one sample delay circuits. In the figure, S2,D2 and OFC denote the same circuit components as those shown in FIG. 8. The terminals X0 and X2 are used as the output terminals in the functional mode FC7 shown in FIG. 9, whereas they are used as the input terminals in functional modes FC0 through FC6 shown in FIGS. 2 through 8, respectively. These terminals are realized using tri-state buffers $1_1$ and $1_2$ as shown in FIG. 10.

The foregoing eight functions accomplish the computations which are widely used for digital signal processing applications.

Turning to FIG. 1, signals entered through input terminals F0, F1 and F2 are supplied to the selection signal generator 500, which then produces selection signals f0 through f11. The selection signals f0 through f11 are delivered to the data input circuit 100, coefficient input circuit 200 and adder circuit 400 so as to determine data connection mode in these circuits. Table 1 shows the truth table for the selection signal generator 500.

TABLE 1

| Truth table for selection signal generator | | | | | | | | | | | | | | | |
|---|---|---|---|---|---|---|---|---|---|---|---|---|---|---|---|
| Inputs | | | | | | | | | | | | | | | |
| Functional | | | | | | | | | Outputs | | | | | | |
| Modes | F2 | F1 | F0 | f0 | f1 | f2 | f3 | f4 | f5 | f6 | f7 | f8 | f9 | f10 | f11 |
| FC0 | 0 | 0 | 0 | 0 | 0 | 0 | 1 | 0 | 0 | 0 | 0 | 0 | 1 | 0 | 0 |
| FC1 | 0 | 0 | 1 | 0 | 0 | 0 | 1 | 0 | 0 | 0 | 1 | 1 | 1 | 1 | 0 |
| FC2 | 0 | 1 | 0 | 0 | 0 | 0 | 1 | 0 | 0 | 0 | 1 | 0 | 1 | 0 | 1 |
| FC3 | 0 | 1 | 1 | 0 | 0 | 0 | 0 | 0 | 1 | 1 | 1 | 1 | 1 | 0 | 0 |
| FC4 | 1 | 0 | 0 | 0 | 0 | 0 | 0 | 0 | 1 | 1 | 1 | 1 | 0 | 0 | 1 |
| FC5 | 1 | 0 | 1 | 0 | 1 | 0 | 0 | 0 | 1 | 0 | 1 | 1 | 1 | 1 | 0 |
| FC6 | 1 | 1 | 0 | 1 | 0 | 0 | 0 | 1 | 0 | 1 | 1 | 1 | 1 | 0 | 0 |
| FC7 | 1 | 1 | 1 | 1 | 0 | 1 | 0 | 0 | 0 | 1 | 1 | 1 | 1 | 0 | 0 |

As can be seen from Table 1, the circuit arrangement embodying the present invention can selectively specify eight kinds of functional modes, FC0 through FC7. The selection signal generator 500 may be arranged by combination of logic circuits, or may be realized by employment of a read only memory (ROM). A clock signal supplied to the input terminal CLK is delivered to the data input circuit 100, coefficient input circuit 200, multiplier circuit 300, adder circuit 400, and control signal generator 600. A sync signal supplied to the input terminal Sin is conducted to the control signal generator 600 so as to produce various control signals necessary for the data input circuit 100, coefficient input circuit 200, multiplier circuit 300 and adder circuit 400. The control signal generator 600 also operates to delay the input sync signal and issues a delayed sync signal on the output terminal Sout.

Eight serial input data are supplied through the input terminals X0 through X3 and Y0 through Y3 to the data input circuits 100. The data input circuit 100 produces 14 outputs, and eight of them are supplied through the intermediate terminals U0 through U3 and V0 through V3 to the multiplier circuit 300, with remaining six outputs being supplied through the intermediate Q0 through Q5 to the adder circuit 400. Eight data of coefficient are supplied through the input terminals C0 through C7 to the coefficient input circuit 200. The coefficient input circuit 200 produces 14 outputs and eight of them are supplied through the intermediate terminals D0 through D7 to the multiplier circuit 300, with remaining six outputs being supplied through the intermediate terminals P0 through P5 to the data input circuit 100. Four output data from the multiplier circuit 300 are supplied through the intermediate terminals W0 through W3 to the adder circuit 400. The adder circuit 400 produces 10 outputs, and four of them are conducted to the output terminals Z0 through Z3, with remaining six outputs being supplied through the intermediate terminals R0 through R5 to the data input circuit 100.

The data input circuit 100, coefficient input circuit 200, multiplier circuit 300 and adder circuit 400 will now be described in detail with reference to the drawings.

FIG. 10 is a detailed block diagram of the data input circuit 100 shown in FIG. 1. In FIG. 10, the same terminal names and signal names as those of FIG. 1 are used for corresponding portions in both figures. The block diagram of FIG. 10 includes input terminals X0 through X3 and Y0 through Y3, intermediate-terminals U0 through U3, V0 through V3, Q0 through Q5 and R0 through R5, and receives selection signals f0 through f3. The diagram further includes tri-state buffers $1_1$ and $1_2$, $\frac{1}{2}$-scaling circuits $2_1$ through $2_4$ for scaling input data by $\frac{1}{2}$, $2^{-n}$-scaling circuits $3_1$ and $3_2$ for scaling input data by $2^{-n}$ (where n = 0, 1, ... 7), and dual-input multiplexers $4_1$ through $4_4$, $5_1$ and $5_2$, $6_1$ through $6_2$, and $7_1$ through $7_4$.

The primary function of the data input circuit shown in FIG. 10 is to prescale input data and to determine the data connection mode of circuitries including the multiplier circuit 300 and adder circuit 400 of FIG. 1 in accordance with each functional mode. Four input data are supplied through the input terminals X0 through X3 to the $\frac{1}{2}$-scaling circuits $2_1$ through $2_4$, and also to the first inputs of the dual-input multiplexers $4_1$ through $4_4$. However, as can be seen from Table 1, signal f2 becomes "1" in functional mode FC7 and the intermediate terminals R4 and R5 are respectively conducted to the input terminals X0 and X2 via the tri-state buffers $1_1$ and $1_2$, thus causing the input terminals X0 and X2 to function as the output terminals. The terminals X0 and X2 are used, of course, as the input terminals in functional modes other than FC7. Four outputs from the $\frac{1}{2}$-scaling circuits $2_1$ through $2_4$ are supplied to the second input of respective dual-input multiplexers $4_1$ through $4_4$. Four outputs of the dual-input multiplexers $4_1$ through $4_4$ are supplied to the first input of the dual-input multiplexers $6_1$ through $6_4$, respectively. Data entered through the intermediate terminals R0 through R3 are supplied to the second input of the dual-input multiplexers $6_1$ through $6_4$. Outputs from the dual-input multiplexers $6_1$ through $6_4$ are conducted to the intermediate terminals $U_0$ through $U_3$, respectively. Outputs from the dual-input multiplexers $6_1$, $6_2$, $6_3$ and $6_4$ are also supplied to the first input of the dual-input multiplexers $7_2$, $7_1$, $7_4$ and $7_3$, respectively. Data entered through the input terminals Y0 and Y1, and outputs from the dual-input multiplexers $5_1$ and $5_2$ are supplied to the second input of the dual-input multiplexers $7_1$ through $7_4$, respectively. Outputs from the dual-input multiplexers $7_1$ through $7_4$ are conducted to the intermediate terminals V0 through V3, respectively. The input terminals Y0 and Y1 are also connected to the intermediate terminals Q0 and Q1, respectively. Data entered through the input terminals Y2 and Y3 are supplied to the first input of dual input multiplexers $5_1$ and $5_2$, and also to the second input of the dual-input multiplexers $5_1$ and $5_2$ through the $2^{-n}$-scaling circuits $3_1$ and $3_2$, respectively. Outputs from the dual-input multiplexers $5_1$ and $5_2$ are conducted to the intermediate terminals Q2 and Q3, and outputs from the dual-input multiplexers $4_2$ and $4_4$ are conducted to the intermediate terminals Q4 and Q5.

Operation of the dual-input multipliers $4_1$ through $4_4$, $5_1$ and $5_2$, $6_1$ through $6_4$ and $7_1$ through $7_4$ is as follows. The dual-input multiplexers $4_1$ through $4_4$ are commonly supplied with selection signal f1. As can be seen from Table 1, f1 goes "1" in mode FC5 and remains at "0" in other functional modes. Here, an assumption is made for all dual-input multiplexers throughout the specification, that the first input (upper input terminal on the drawings) is selected and coupled to the output when the selection signal is "0", and the second input (bottom input terminal on the drawings) is selected and coupled to the output when the selection signal is "1". Accordingly, the dual-input multiplexers $4_1$ through $4_4$ transmit outputs of the $\frac{1}{2}$-scaling circuits $2_1$ through $2_4$ only in functional mode FC5. The dual-input multiplexers $5_1$ and $5_2$ are commonly supplied with f0, and they transmit outputs of the $2^{-n}$-scaling circuits $3_1$ and $3_2$ only in modes FC6 and FC7, as can be seen from Table 1. The dual-input multiplexers $6_1$ through $6_4$ are commonly supplied with selection signal f2, and they transmit data received from the intermediate terminals R0 through R3 only in mode FC7, as can be seen from Table 1. The dual-input multiplexers $7_1$ through $7_4$ are commonly supplied with selection signal f3, and they transmit data received from the intermediate terminals Q0 through Q3 only in modes FC0, FC1 and FC2, as can be seen from Table 1. In this manner, the data connection mode is determined according to the eight functional modes.

The $\frac{1}{2}$-scaling circuits $2_1$ through $2_4$ and the $2^{-n}$-scaling circuits $3_1$ and $3_2$ shown in FIG. 10 will now be described in detail.

The $2-n$-scaling circuit shown in FIG. 11 is made up of an input terminal 8, a tapped delay element 9, a delay element 10, a dual-input multiplexer 11, an output terminal 12, a latch 13, dual-input multiplexers $14_1$, ... $14_6$ and $14_7$, and an octa-input multiplexer 15. The circuit includes intermediate terminals P0, P1 and P2, and receives control signal t0, ... $t_5$ and $t_6$, and selection signal f0.

FIG. 11 is a detailed block diagram of the $2^{-n}$-scaling circuit illustrated as $3_1$ and $3_2$ in FIG. 10, and intermediate terminals P0, P1 and P2 in FIG. 10 and intermediate terminals P3, P4 and P5 are effective for the $2^{-n}$-scaling circuit $3_1$ and $3_2$ shown in FIG. 10, respectively.

Operation of the $2^{-n}$-scaling circuit shown in FIG. 11 will now be described with reference to the timing chart of FIG. 13.

Data entered through the input terminal 8 is delivered to the tapped delay element 9 and the latch 13. Since input data is topped by LSB as mentioned earier, the most significant bit (MSB), i.e. the last bit, of each word is held by the latch 13 for a duration of one word length.

Figure 13:
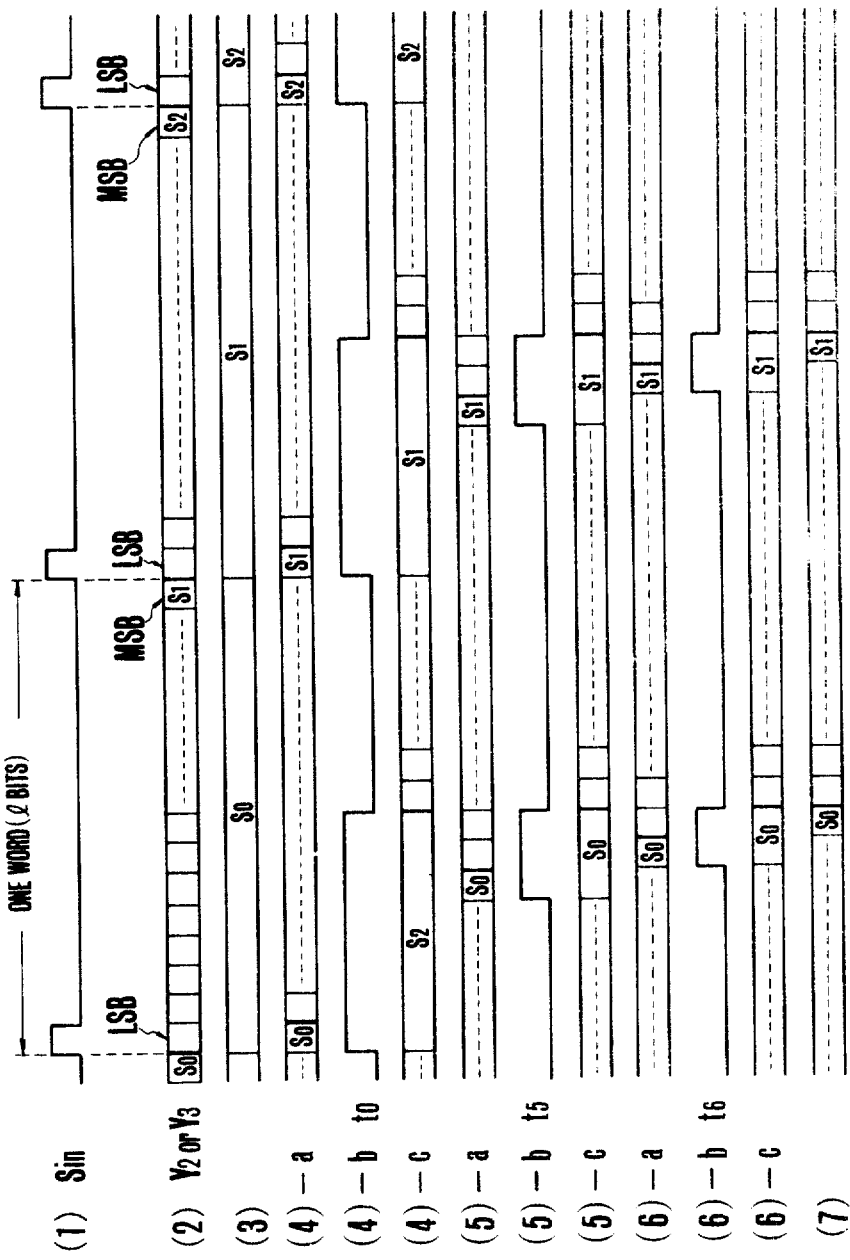
FIG. 13 is a timing chart useful to explain the operation of the $2^{-n}$-scaling circuit of FIG. 11.

FIG. 13 shows in section (1) a waveform of the sync signal received at the input terminal Sin, and illustrates in section (2) data received at the input terminal Y2 and Y3. FIG. 13 illustrates in section (3) the timing of the output of the latch 13, showing that the output of MSB (i.e. sign bit) is latched for a duration of one word length before it is delivered out. The output from the latch 13 is supplied to the second input of the dual-input multiplexers $14_1$, ... $14_6$ and $14_7$. Output from the tapped delay element 9 is supplied to the first input of the octa-input multiplexer 15, and outputs of the dual-input multiplexers $14_7$, $14_6$, ... $14_1$ are supplied to the second, third ... and eighth inputs of the octa-input multiplexer 15. The seven dual-input multiplexers $14_1$, ... $14_6$ and $14_7$ are supplied with selection signals $t_0$, ... $t_5$ and $t_6$, respectively, and they produce outputs by elongating the sign bit by 7 bits, ... 2 bits and 1 bits, respectively.

FIG. 13 illustrates in sections (4)-a, (5)-a and (6)-a the timing of input data received by the dual-input multiplexers $14_1$, ... $14_6$ and $14_7$. FIG. 13 shows in sections (4)-b, (5)-b and (6)-b the waveform of control signals $t_0$, ... $t_5$ and $t_6$ supplied to the dual-input multiplexers $14_1$ ... $14_6$ and $14_7$, respectively. FIG. 13 shows in sections (4)-c, (5)-c and (6)-c the waveform of outputs from the dual-input multiplexers $14_1$, ... $14_6$ and $14_7$, respectively. FIG. 13 illustrates in section (7) the timing of output on the last tap of the tapped delay element 9. Accordingly, the first input of the octa-input multiplexer 15 receives data without scaling, the second input receives $2^{-1}$-scaled data, the third input receives $2^{-2}$-scaled data, and the eighth input receives $2^{-7}$-scaled data. Thus, the octa-input multiplexer 15 can select one of eight scaled data (scaling of $2^0$ through $2^{-7}$) in accordance with the combination of selection signals (0's and 1's) entered through the intermediate terminals P0, P1 and P2 (or P3, P4 and P5). Table 2 shows the correspondence between the combination of selection signals on the intermediate terminals P0, P1 and P2 (or P3, P4 and P5) and the magnitude of scaling.

TABLE 2

| Signals on intermediate terminals | | | |
|---|---|---|---|
| $P_0(P_3)$ | $P_1(P_4)$ | $P_2(P_5)$ | Magnitude of scaling |
| 0 | 0 | 0 | $2^0$ |
| 0 | 0 | 1 | $2^{-1}$ |
| 0 | 1 | 0 | $2^{-2}$ |
| 0 | 1 | 1 | $2^{-3}$ |
| 1 | 0 | 0 | $2^{-4}$ |
| 1 | 0 | 1 | $2^{-5}$ |
| 1 | 1 | 0 | $2^{-6}$ |
| 1 | 1 | 1 | $2^{-7}$ |

It should be noted that eight input data delivered to the octa-input multiplexer 15 have the same LSB position, so that control signals for the multiplier and adder circuits in FIG. 1 need not vary depending on the magnitude of scaling.

Output from the octa-input multiplexer 15 is supplied to the second input of the dual-input multiplexer 11. Output from the tapped delay element 9 is supplied through the delay element 10 to the first input of the dual-input multiplexer 11. Output from the dual-input multiplexer 11 is conducted to the output terminal 12. The dual-input multiplexer 11 is supplied with selection signal f0, and it transmits output of the octa-input multiplexer 15 only in functional modes FC6 and FC7, as can be seen from Table 1. As will be described later, the $2^{-n}$-scaling circuit shown in FIG. 11 is used to scale the input signal of two types of 2-order recursive filters which are realized in the modes FC6 and FC7. In the foregoing description, the maximum value of "n" was assumed to be 7. However, the principle illustrated in FIG. 11 shows that the maximum value of "n" can be increased without any difficulty. Operation of the delay element 10, which is concerned with functional mode FC4, will be described later.

The ½-scaling circuit shown in FIG. 12 is made up of an input terminal 50, an output terminal 51, a flip-flop 16, and dual-input multiplexers 17 and 18. The circuit receives control signal $t_7$, and further includes an intermediate terminal P0. The ½-scaling circuit of FIG. 12 corresponds to ½-scaling circuits $2_1$ through $2_4$ shown in FIG. 10. Data received by the input terminal 50 is supplied to the input of the flip-flop 16 and also to the second input of the dual-input multiplexer 17. Output from the flip-flop 16 is supplied to the first input of the dual-input multiplexers 17 and 18. Output from the dual-input multiplexer 17 is supplied to the second input of the dual-input multiplexer 18, and output from the dual-input multiplexer 18 is delivered to the output terminal 51. The dual-input multiplexer 17 usually transmits the signal on its second input due to control signal $t_7$, however, for a specific one bit of each word, it transmits only the sign bit of input data which is derived from the flip-flop 16 and received on its first input. Accordingly, the dual-input multiplexer 17 performs ½-scaling on data received at the input terminal 50 and delivers the result to the output terminal 51. Output of the flip-flop is identical to the input, but delayed by one bit, and thus two inputs of the dual-input multiplexer 18 have the same timing of LSB, with the first input being of data without scaling and the second input being of ½-scaled data. Accordingly, when the selection signal at the intermediate terminal P0 is "0", data without scaling is delivered to the output terminal 51, and when the selection signal is "1", ½-scaled data is delivered to the output terminal 51. The intermediate terminal P0 corresponds to that shown in FIG. 1.

Figure 14:
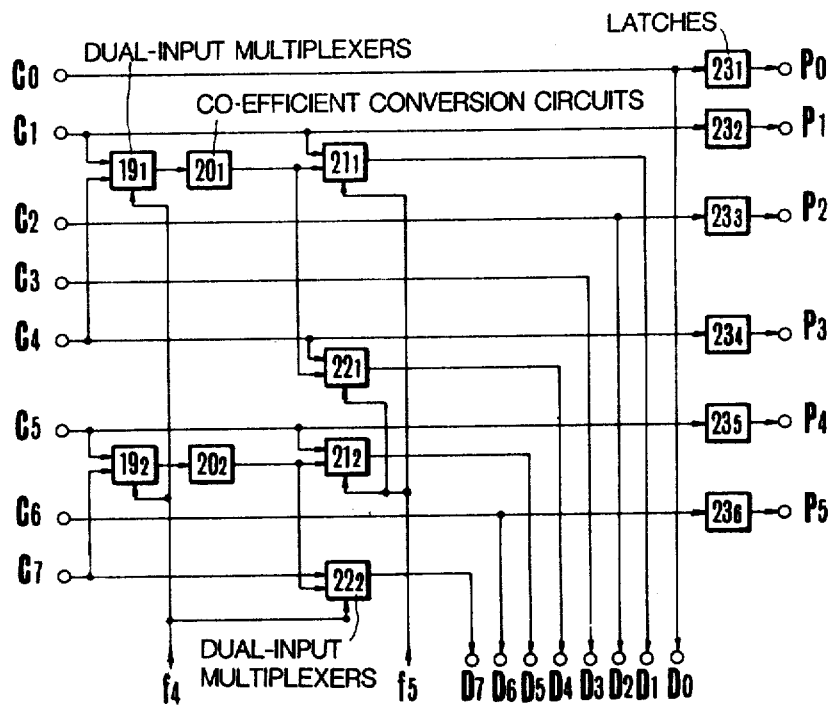
FIG. 14 is a block diagram showing the coefficient input circuit shown in FIG. 1.

FIG. 14 is a detailed block diagram of the coefficient input circuit 200 shown in FIG. 1, and the common terminal names and signal names are used in both figures. The circuit includes input terminals C0 through C7; intermediate terminals P0 through P5 and D0 through D7; dual-input multiplexers $19_1$, $19_2$, $21_1$, $21_2$, $22_1$ and $22_2$; coefficient conversion circuit $20_1$ and $20_2$ and latches $23_1$ through $23_6$. The circuit receives selection signals f4 and f5. Prior to the description on the operation of the circuit, the data input format will first be described.

Generally, in digital signal processing, the number of bits for data must be equal to or larger than the number of bits for coefficients. The present invention is based on the assumption that when the number of coefficient bits is m (m: a positive integer), the number of data bits is m+2 or more. This condition will not limit the application field of the present invention. The hardware requirement for the multiplier, which will be described later, depends on the number of coefficient bits, m, and 14 bits are considered sufficient in usual digital signal processing. Accordingly, in this embodiment with the value of m being set to 14, an arbitrary number not less than 16 can be set for the number of data bits. Data supplied to the input terminals C0 through C7 in FIG. 14 can contain at least 16 bits of information for each word, and 14 bits of them are assigned to the coefficient for the multiplier. Remaining two bits are assigned to information on scaling as described with reference to FIGS. 11 and 12, and to information on 2's complement as will be described later, whereby the present invention provides a digital signal processor suited for LSI fabrication which is easy to use and requires less package pins.

Figure 15:
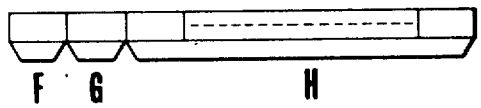
FIG. 15 is an illustration showing the field format of data entered to the coefficient input circuit.

FIG. 15 illustrates the format of data supplied to the input terminals C0 through C7 in FIG. 14. In FIG. 15, a one-bit field F is assigned to the above-mentioned scaling information, and a one-bit field G is assigned to information on 2's complement as will be described later. A 14-bit field H is assigned to the coefficient bit, which is topped by LSB.

Operation of the coefficient input circuit will now be described with reference to FIG. 14.

Data having the fields specified as shown in FIG. 15 are received by the input terminals C0 through C7. Data entered through the input terminals C0, C1, C2, C4, C5 and C6 are held by latches $23_1$, $23_2$, $23_3$, $23_4$, $23_5$ and $23_6$, respectively, which hold each scaling information bit shown as F in FIG. 15 for a data bit length, and deliver their outputs to the intermediate terminals P0, P1, P2, P3, P4 and P5. A 3-bit pattern on the intermediate terminals P0, P1 and P2 and another 3-bit pattern on the intermediate terminals P3, P4 and P5 are supplied to the $2^{-n}$-scaling circuits $3_1$ and $3_2$ of FIG. 10, respectively, so that the magnitude of scaling is determined. In this embodiment, a pair of 3 bits data are used to determine individual magnitudes of scaling, however, it is also possible to carry out scaling in the range of $2^0$ to $2^{-15}$ using each 4 bits data by adding the F-bit data received at the input terminals C4 and C7. In this case, however, the capacity of the tapped delay element 9 and the number of dual-input multiplexers $14_1, \ldots, 14_6$ and $14_7$ need to be increased, and the octa-input multiplexer needs to be replaced with a 16-input multiplexer. Scaling information at the intermediate terminal P0 is also supplied to the ½-scaling circuits $2_1$ through $2_4$ in FIG. 10, and thus the ½-scaling circuits can perform $2^0$ or $2^{-1}$-scaling by the scaling information in mode FC5, i.e., when the processor functions as the butterfly circuit, as will be described later.

In FIG. 14, data received at the input terminals C1 and C4 are supplied to the first and second inputs of the dual-input multiplexer $19_1$, respectively. Data received by the input terminals C5 and C7 are supplied to the first and second inputs of the dual-input multiplexer $19_2$, respectively. Output from the dual-input multiplexer $19_1$ is supplied through the coefficient conversion circuit $20_1$ to the second inputs of the dual-input multiplexers $21_1$ and $22_1$. Output from the dual-input multiplexer $19_2$ is supplied through the coefficient conversion circuit $20_2$ to the second inputs of the dual-input multiplexers $21_2$ and $22_2$. The dual-input multiplexers $21_1$, $22_1$, $21_2$ and $22_2$ are further supplied with data at their first inputs directly from the input terminals C1, C4, C5 and C7, respectively. Outputs from the dual-input multiplexers $21_1$, $22_1$, $21_2$ and $22_2$ are conducted to the intermediate terminals D1, D4, D5 and D7, respectively. The input terminals C0, C2, C3 and C6 are directly connected to the intermediate terminals D0, D2, D3 and D6, respectively. The dual-input multiplexers $19_1$, $19_2$, $22_1$ and $22_2$ are commonly supplied with selection signal f4, and the dual-input multiplexers $21_1$ and $21_2$ are commonly supplied with selection signal f5. Since the selection signals f4 and f5 comply with the truth table of Table 1, connection between the input terminals C1, C4, C5 and C7 and the intermediate terminals D1, D4, D5 and D7 will be as follows. In functional modes FC0, FC1, FC2 and FC7, the input terminals C1, C4, C5 and C7 are connected directly to the intermediate terminals D1, D4, D5 and D7, respectively. In functional modes FC3, FC4 and FC5, the input terminals C1 and C5 are connected through the coefficient conversion circuits $20_1$ and $20_2$ to the intermediate terminals D1 and D5 and the input terminals C4 and C7 are directly connected to the intermediate terminals D4 and D7, respectively. In functional mode FC6, the input terminals C1 and C5 are directly connected to the intermediate terminals D1 and D5, and the input terminals C4 and C7 are connected through the coefficient conversion circuits $20_1$ and $20_2$ to the intermediate terminals D5 and D7, respectively.

The coefficient conversion circuits $20_1$ and $20_2$ will now be described in detail.

Figure 16:
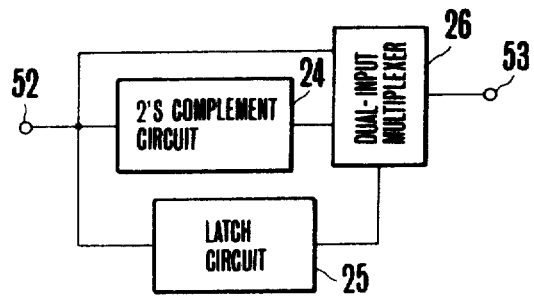
FIG. 16 is a block diagram showing the coefficient conversion circuit shown in FIG. 14.

FIG. 16 is a detailed diagram of the coefficient conversion circuits $20_1$ and $20_2$ shown in FIG. 14. The circuit is made up of an input terminal 52, an output terminal 53, a 2's complement circuit 24, a latch 25, and a dual-input multiplexer 26. Data having fields specified as shown in FIG. 15 is supplied through the input terminal 52 to the 2's complement circuit 24, latch 25 and the first input of the dual-input multiplexer 26. The latch 25 holds the G-bit indicating 2's complement information to produce a selection signal supplied to the dual-input multiplexer 26. Of data received by the input terminal 52, the H bits representing coefficient information are subjected to 2's complement by the complement circuit 24, and the result is supplied to the second input of the dual-input multiplexer 26. Details of 2's complement operation is disclosed in an article entitled "An Approach to the Implementation of Digital Filters", by L. B. Jackson et al., IEEE Transactions On Audio And Electroacoustics, VOL. AU-16 No. 3, September 1968, pp. 413-421, particularly FIG. 8 on p. 416.

In FIG. 16, the dual-input multiplexer 26 transmits data at its first input when the latch 25 outputs "0", and data at its second input when the selection signal is "1". Accordingly the H-bits containing coefficient information are subjected to 2's complement and delivered to the output terminal 53 when the G-bit of data received through the input terminal 542 is "1". The coefficient conversion circuit is useful particularly in performing complex multiplication. The complex multiplication can be expressed generically in the following formula:

$$(X+jY)(A+jB)=[AX+(-B)Y+j(BX+AY)]$$

The above formula necessitates three coefficients: A, −B and B, causing the external memory to increase for supplying these coefficients. On the other hand, the coefficient conversion circuit according to the present invention necessitates only two coefficients of A and B, making possible the reduction of hardware requirement for external circuits. The coefficient conversion circuit is used in functional modes FC3, FC4 and FC5, as described previously.

It is known that coefficients of a complex digital filter obtained from a real coefficient digital filter by shifting the frequency by $f_s/4$ (where $f_s$: sampling frequency) are pure real or pure imaginary values. There are six coefficients for such complex elliptic digital filter, and two pairs of them have each the same magnitude with opposite sign. Thus, the coefficient conversion circuit of this invention can advantageously be used in functional modes FC6 and FC7. The foregoing complex digital filter can be applied, for example, to transmultiplexers which can perform bilateral conversion between the Time Division Multiplexer (TDM) and Frequency Division Multiplex (FDM) signals.

FIG. 17 is a detailed block diagram of the multiplier circuit 300 shown in FIG. 1. The circuit includes intermediate terminals U0 through U3, V0 through V3, D0 through D7, and W0 through W3; multipliers $27_1$ through $27_8$; and adders $28_1$ through $28_4$. Eight data received by the intermediate terminals U0 through U3 and V0 through V3 are supplied to the multipliers $27_1$, $27_3$, $27_5$, $27_7$, $27_2$, $27_4$, $27_6$, and $27_8$, respectively. Eight coefficients received by the intermediate terminals D0 through D7 are supplied to the multipliers $27_1$ through $27_8$. In this case, the multipliers $27_1$ through $27_8$ receive only H-bit data containing coefficient information as shown in FIG. 15 through the intermediate terminals D0 through D7. Outputs from the multipliers $27_1$ and $27_2$ are supplied to the adder $28_1$, outputs from the multipliers $27_3$ and $27_4$ are supplied to the adder $28_2$, outputs from the multipliers $27_5$ and $27_6$ are supplied to the adder $28_3$, and outputs from the multipliers $27_7$ and $27_8$ are supplied to the adder $28_4$. Outputs from the adders $28_1$ through $28_4$ are conducted to the intermediate terminals W0 through W3. Here, the multipliers $27_1$ through $27_8$ are assumed to be, for example, pipeline multipliers which do not need the guard bit. Various control signals necessary for the multipliers $27_1$ through $27_8$ and adders $28_1$ through $28_4$ are all supplied from the control signal generator 600 shown in FIG. 1.

FIG. 18 is a detailed block diagram of the adder circuit 400 shown in FIG. 1. The circuit includes intermediate terminals W0 through W3, R0 through R5 and Q0 through Q5, and output terminals Z0 through Z3, and receives selection signals f0, f1, f2, f3, f4, f6, f7, f8, f9, f10, and f11. All of these terminal names and signal names correspond to those in FIG. 1. The circuit further includes dual-input multiplexers $29_1$, $29_2$, $30_1$, $30_2$, $32_1$, $32_2$, $33_1$ through $33_4$, $36_1$, $36_2$, 40, $45_1$, and $45_2$; delay elements $31_1$ and $31_2$; AND gates $34_1$, $34_2$, $35_1$, $35_2$, $37_1$, $37_2$, 41, and 42; adders $38_1$, $38_2$, $43_1$ and $43_2$; adder-subtractors $39_1$ and $39_2$; and overflow detection/correction circuits $44_1$ and $44_2$.

In FIG. 18, data entered through the intermediate terminal W0 is supplied to the first input of the dual-input multiplexers $30_1$ and $32_1$. Data entered through the intermediate terminal W1 is supplied to the first input of the dual-input multiplexer $29_1$ and the second input of $29_2$, and also conducted to the intermediate terminal R4. Data entered through the intermediate terminal W2 is supplied to the second input of the dual-input multiplexer $29_1$ and the first input of $29_2$. Data from the intermediate terminal W3 is supplied to the first input of the dual-input multiplexers $33_2$ and $36_2$ and to the AND gate 42, and further conducted to the intermediate terminal R5. The dual-input multiplexers $29_1$ and $29_2$ are commonly supplied with selection signal f0, and they transmit the second input data only in functional modes FC6 and FC7, as can be seen from Table 1.

Data entered through the intermediate terminals Q0 through Q3 are supplied to the second input of the dual-input multiplexers $33_1$ through $33_4$, respectively. Data entered through the intermediate terminals Q2 and Q3 are also supplied to the second input of the dual-input multiplexers $30_2$ and $30_1$. Output from the dual-input multiplexer $30_1$ is supplied through the delay element $31_1$ to the second input of the dual-input multiplexer $32_1$. Output from the delay element $31_1$ is conducted to the intermediate terminal R2. Output from the dual-input multiplexer $29_1$ is supplied to the first input of the dual-input multiplexers $30_2$ and $32_2$. Output from the dual-input multiplexer $30_2$ is supplied through the delay element $31_2$ to the second input of the dual-input multiplexer $32_2$. Output from the delay element $31_2$ is conducted to the intermediate terminal R0. The dual-input multiplexers $30_1$ and $30_2$ are commonly supplied with selection signal f2, and they transmit the second input data only in functional mode FC7, as can be seen from Table 1. The dual-input multiplexers $32_1$ and $32_2$ are commonly supplied with selection signal f4, and they transmit the second input data only in functional mode FC6, as can be seen from Table 1.

Subsequently, output from the dual-input multiplexer $32_1$ is supplied to the adder $38_1$ and to the first input of the dual-input multiplexer 33. Output from the dual-input multiplexer $32_2$ is supplied to the adder $38_2$ and to the first input of the dual-input multiplexer $33_4$. Output from the dual-input multiplexer $29_2$ is supplied to the first input of the dual-input multiplexers $33_1$, $36_1$ and 40. The dual-input multiplexers $33_1$ through $33_4$ are commonly supplied with control signal f6, and they transmit the second input data in functional modes FC3, FC4, FC6 and FC7, as can be seen from Table 1. Output from the dual-input multiplexers $33_1$ through $33_4$ are supplied to the AND gates $34_1$, $34_2$, $35_1$ and $35_2$, respectively. The AND gates $34_1$ and $34_2$ are commonly supplied with the selection signal f7, and they produce "0" only inmode FC0, but transmit input data in remaining seven functional modes, as can be seen from Table 1. The AND gates $35_1$ and $35_2$ are commonly supplied with selection signal f8, and they produce "0" only in modes FC0 and FC2, but transmit input data in remaining six functional modes, as can be seen from Table 1. Data entered through the intermediate terminals Q4 and Q5 are supplied to the second input of the dual-input multiplexers $36_1$ and $36_2$, and outputs from them are supplied to the AND gates $37_1$ and $37_2$, respectively. Outputs from the AND gates $37_1$ and $37_2$ are supplied to the adder-subtractors $39_1$ and $39_2$, respectively. Outputs from the AND gates $34_1$, $34_2$, $35_1$ and $35_2$ are supplied to the adders $38_1$ and $38_2$ and also to adder-subtractors $39_1$ and $39_2$. The dual-input multiplexers $36_1$ and $36_2$ are commonly supplied with selection signal f2, and they transmit the second input data only in mode FC7, as can be seen from Table 1. The AND gates $37_1$ and $37_2$ are commonly supplied with selection signal f9, and they produce "0" only in mode FC4, but transmit input data in remaining seven functional modes, as can be seen from Table 1. The adder-subtractors $39_1$ and $39_2$ are supplied with the selection signal f10, and they function as subtractors only in modes FC1 and FC5, but function as adders in remaining six functional modes, as can be seen from Table 1.

Output from the adder $38_1$ is supplied to the adder $43_1$. Output from the adder $38_2$ is supplied to the adder $43_2$ and also to the second input of the dual-input multiplexer 40. Outputs from the AND gates 41 and 42 are supplied to the adders $43_1$ and $43_2$, respectively. The dual-input multiplexer 40 is supplied with selection signal f3, and it transmits the second input data only in modes FC0, FC1 and FC2, as can be seen from Table 1. The AND gate 41 is supplied with selection signal f11, and it transmits input data only in modes FC2 and FC4, but produces "0" in remaining six functional modes, as can be seen from Table 1. The AND gate 42 is supplied with selection signal f1, and it transmits input data only in mode FC5, but produces "0" in remaining seven functional mode, as can be seen from Table 1. Output from the adder-subtractor $39_1$ is supplied to the overflow detection/correction circuit $44_1$ and also to the first input of the dual-input multiplexer $45_1$. Output from the adder-subtractor $39_2$ is supplied to the overflow detection/correction circuit $44_2$ and also to the first input of the dual-input multiplexer $45_2$. Outputs from the overflow detection/correction circuit $44_1$ and $44_2$ are supplied to the second input of the dual-input multiplexers $45_1$ and $45_2$, and also conducted to the intermediate terminals R1 and R3. The dual-input multiplexers $45_1$ and $45_2$ are supplied with selection signal f0, and they transmit the second input data only in modes FC6 and FC7, as can be seen from Table 1. Outputs from the adders $43_1$ and $43_2$ and the dual-input multiplexers $45_1$ and $45_2$ are delivered to the output terminals Z0 through Z3, respectively.

The delay elements $31_1$ and $31_2$ in FIG. 18 are used to compensate the delay in the loop circuits in functional modes FC6 and FC7 which realize two types of 2-order recursive digital filters as mentioned previously. The overflow detection/correction circuits $44_1$ and $44_2$ are also necessary only in modes FC6 and FC7 for preventing the limit cycle oscillation in the feedback loop. The overflow detection/correction circuit is described in detail in the first-mentioned article entitled "Special-Purpose Hardware for Digital Filtering", by S. L. Freeny, Proceedings Of The IEEE.

As described above, the present invention offers a digital signal processor suited for LSI fabrication, which (1) is general-purpose oriented, (2) requires less input/output pins (28 pins in the foregoing embodiment), (3) requires less external circuitry, and (4) is easy to use for the user.

What is claimed is:

1. A digital signal processor suited for LSI fabrication comprising:
   data input circuit means for carrying out scaling on a plurality of serial data supplied through a first external terminal group;
   coefficient input circuit means for carrying out 2's complement conversion on a plurality of specific data from a plurality of serial data supplied through a second external terminal group;
   multiplier circuit means for carrying out a plurality of multiplications and additions on data from said data input circuit means and said coefficient input circuit means;
   adder circuit means for carrying out a plurality of additons and subtractions as well as overflow detection and correction on data from said multiplier circuit means and said data input circuit means, and for supplying data to a third external terminal group and said data input circuit means; and
   means for altering data connections in each of said circuits depending on the combination of logical zeros and ones entered through a fourth external terminal group so that one of a plurality of functional modes is selected.

2. A digital signal processor as claimed in claim 1 further comprising:
   means for attaching first and second flag bits to each of a plurality of serial data supplied through said second external terminal group so that said coefficient input circuit means supplies a bit pattern of said first flag bits to said data input circuit means, said bit pattern corresponding to the magnitude of scaling; and means for supplying said second flag bits to said coefficient input circuit means for determining whether or not said flag bits are subjected to 2's complement conversion.

3. A digital signal processor as claimed in claim 1 wherein said altering means comprises a selection signal generator circuit means which receives the combination of logical zeros and ones defining the functional modes so as to produce a plurality of selection signals, and a control signal generator circuit means electrically coupled to the selection signal generator circuit means to produce a plurality of control signals in a predetermined sequence, said selection signals being used to control dual-multiplexers included in said data input circuit means, coefficient input circuit means, multiplier circuit means and adder circuit means for selecting the functional modes, said control signals being used to control scaling circuits included in said data input circuit means.

* * * * *